Nov. 11, 1958   M. D. PARMENTER   2,859,541
QUESTION AND ANSWER SHEET WITH ANSWERS ON BOTH
FACES READABLE THROUGH TRANSLUCENT AREA
Filed Dec. 16, 1955   4 Sheets-Sheet 1

Inventor
MORGAN D. PARMENTER
By: Fetherstonhaugh & Co.
Att'ys

Nov. 11, 1958     M. D. PARMENTER     2,859,541
QUESTION AND ANSWER SHEET WITH ANSWERS ON BOTH
FACES READABLE THROUGH TRANSLUCENT AREA
Filed Dec. 16, 1955                                        4 Sheets-Sheet 2

Inventor
MORGAN D. PARMENTER
By: Fetherstonhaugh+Co.
Att'ys

Nov. 11, 1958 M. D. PARMENTER 2,859,541
QUESTION AND ANSWER SHEET WITH ANSWERS ON BOTH
FACES READABLE THROUGH TRANSLUCENT AREA
Filed Dec. 16, 1955 4 Sheets-Sheet 3

Inventor
MORGAN D. PARMENTER
By: Fetherstonhaugh & Co.
Att'ys

Nov. 11, 1958 M. D. PARMENTER 2,859,541
QUESTION AND ANSWER SHEET WITH ANSWERS ON BOTH
FACES READABLE THROUGH TRANSLUCENT AREA
Filed Dec. 16, 1955 4 Sheets-Sheet 4

Inventor
MORGAN D. PARMENTER
By: Fetherstonhaugh & Co.
Att'ys

United States Patent Office 2,859,541
Patented Nov. 11, 1958

2,859,541

QUESTION AND ANSWER SHEET WITH ANSWERS ON BOTH FACES READABLE THROUGH TRANSLUCENT AREA

Morgan D. Parmenter, Toronto, Ontario, Canada, assignor to The Guidance Centre, University of Toronto, Ontario College of Education, Toronto, Ontario, Canada Application December 16, 1955, Serial No. 553,659

3 Claims. (Cl. 35—48)

This invention relates to Improvements in Examination Material of the type wherein the examination paper contains several printed answer spaces for each question and one of which may be selected by the examinee for the insertion of a mark which indicates his chosen answer to the question. To facilitate the rapid and accurate correction of this type of examination paper by the examiner, it is general practice to use a stencil having areas therein which register with the correct answer spaces on the examination paper and whereby said answer spaces may be quickly scanned when the stencil is placed over the examination paper to determine if the correct answer has been marked by the pupil.

As this type of examination paper generally contains a number of columns of questions and corresponding answer spaces printed on both sides of the sheet or a plurality of sheets such as a booklet, it has been heretofore necessary to provide a correction stencil for each column of answer spaces which tends to make correction somewhat complex and time consuming for the examiner.

The present invention avoids these disadvantages and its purpose is to provide an arrangement whereby a single stencil will permit the examiner simultaneously to correct answers inserted by the examinee on different surfaces of the examination paper which may be comprised of one sheet having answers on two surfaces thereof, or a plurality of sheets having answers on surfaces thereof.

The invention generally comprises sheet material paper stock having a plurality of surfaces, each surface bearing questions to be answered and having a plurality of correct and incorrect answer spaces choosable at the election of the examinee wherein said answer spaces are located in answer areas, the answer area on one surface being located to correspond with the answer area of another surface, one underlying the other, the answer spaces on one surface being offset from those of said other surface or surfaces whereby all answer spaces and answers are discernible simultaneously from the uppermost surface, the correctness of the answers on said surfaces being simultaneously determined through the observing area in the stencil. The stencil may be wholly transparent, in which case the observing area coincides with the location of the correct answer space readily indicated by a suitable marking on the stencil. Preferably the invention includes in combination an illuminating device including a support for receiving paper, having a light transmitting area, a means for locating said paper in predetermined position to dispose the answer in registry with said light transmitting area and the illuminating device, a means for locating the stencil in registry with the said answer area of the paper and the illuminating device, and a means of maintaining the stencil and paper in close contact. Means may also be provided for retracting the stencil.

The invention will be clearly understood by reference to the following detailed specification taken in conjunction with the accompanying drawings, in which.

Figure 1:
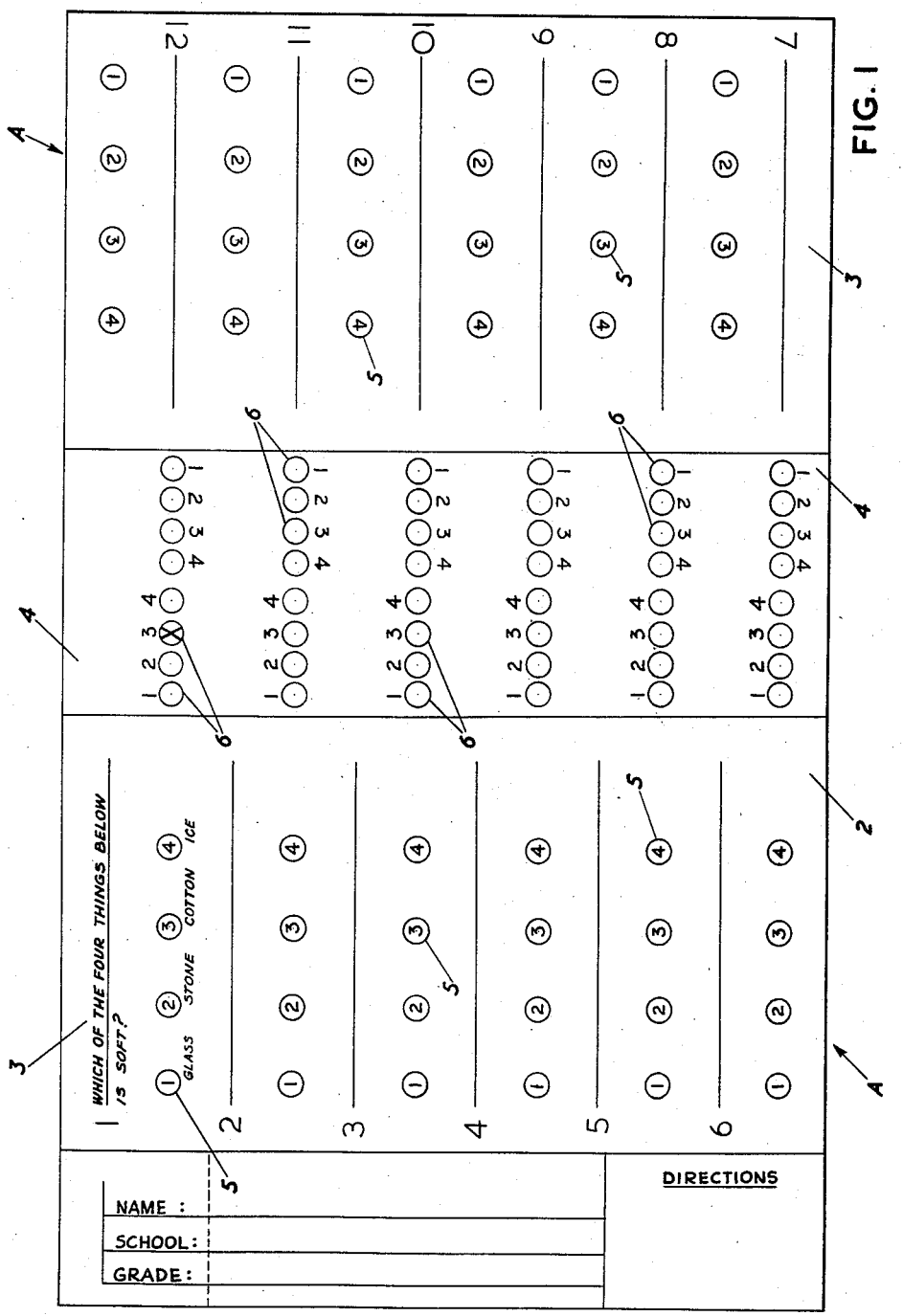
Fig. 1 is a plan view of one side of a preferred form of examination paper.
Figure 2:
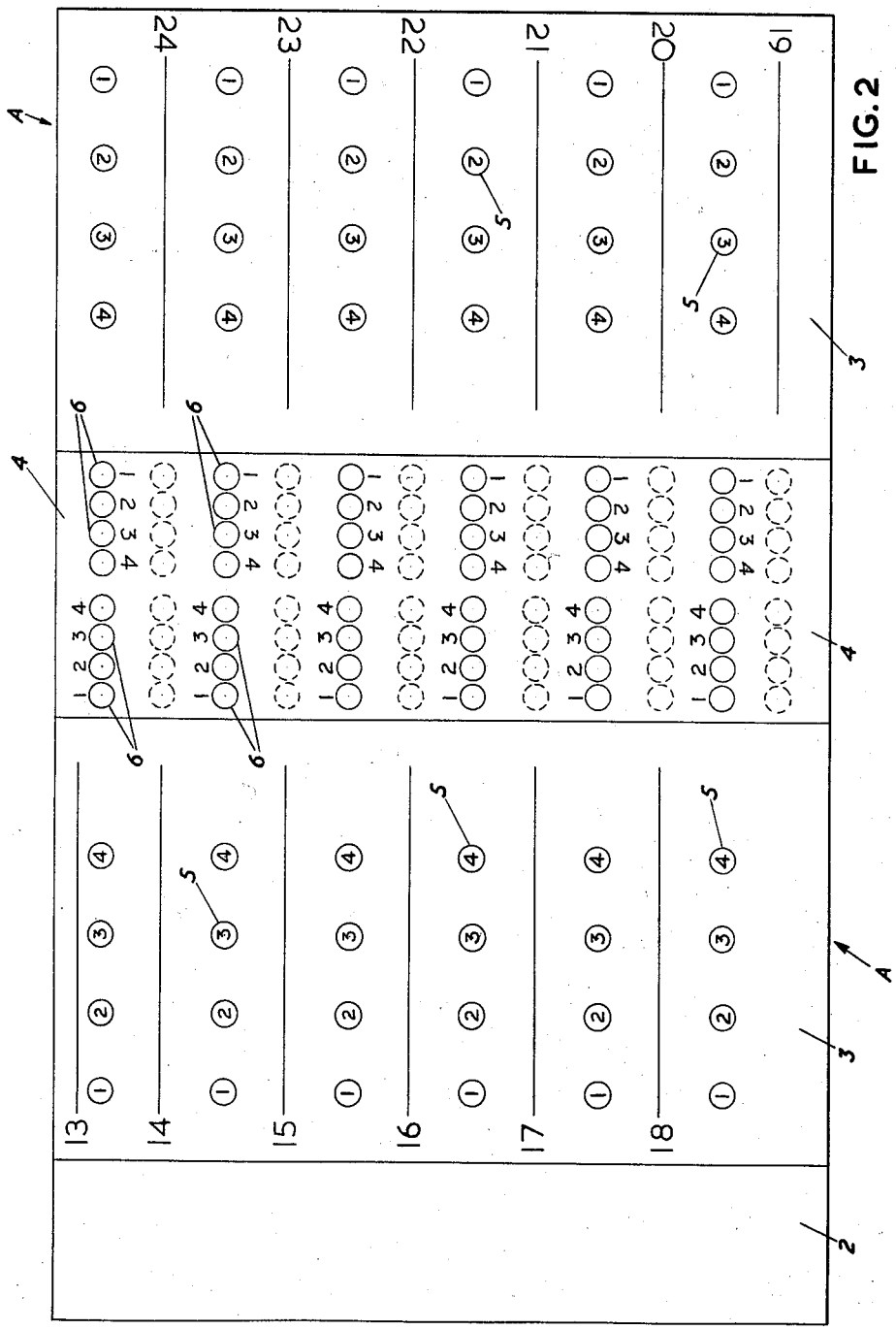
Fig. 2 is a plan view of the other side of the paper.

Referring to Figs. 1 and 2, which illustrate an examination paper printed on both sides, Fig. 1 illustrating the front side and Fig. 2 the reverse side, the paper is represented as a whole by the letter A printed on paper stock 2 having reasonable translucent characteristics. The type of examination paper to which the invention is more particularly directed is known as an objective test having questions appearing in a question area 3 to be answered in an answer area 4 wherein each question is provided with a series of numbered answers 5, one of which is correct as, for example, No. 3 in the first question, Fig. 1. The answer area 4 bears a plurality of sets of answer spaces 6, each set being in alignment with a question and its spaces numbered to correspond with the numbered selectable answers 5 for the question. The examinee in answering a question selects an answer from those provided and inserts a mark in the answer space bearing the same number as the answer selected. In the illustrated question in Fig. 1, the cross inserted in answer space No. 3 indicates a correct answer to the question.

As illustrated in Figs. 1 and 2, two sets of questions and answers appear on each side of the same surface of the sheet, the questions and answers of one set of the same side of the sheet being reversed to those on the other side of the same surface of the sheet in order to avoid any confustion between the two and to dispose the answer areas 4 adjacent one another. Moreover, by comparing Figs. 1 and 2, it will be noted that the questions and answers on this surface are in the same relation and position so that the answer areas on the reverse surface of the sheet register with the answer areas on the other surface of the sheet. One difference, however, occurs, viz. that the answer spaces 6 on one surface of the sheet are offset in relation to the answer surfaces on the opposite surface of the sheet so that those in one surface of the sheet are disposed in the answer area along a line or in an area different from those in the answer area on the other surface of the sheet. Thus, since the paper stock is reasonably translucent or, as will later appear, the answer area may be somewhat transparent, it will be apparent that the answer marks placed on both sides of the sheet will be visible from the uppermost side of the sheet in the common answer areas 4 of each surface when light is caused to pass through the sheet. Accordingly, the answers on both surfaces can be checked from the uppermost surface in a quick and simple manner without it being necessary to reverse the sheet and which will be dealt with in more detail hereinafter.

Figure 3:
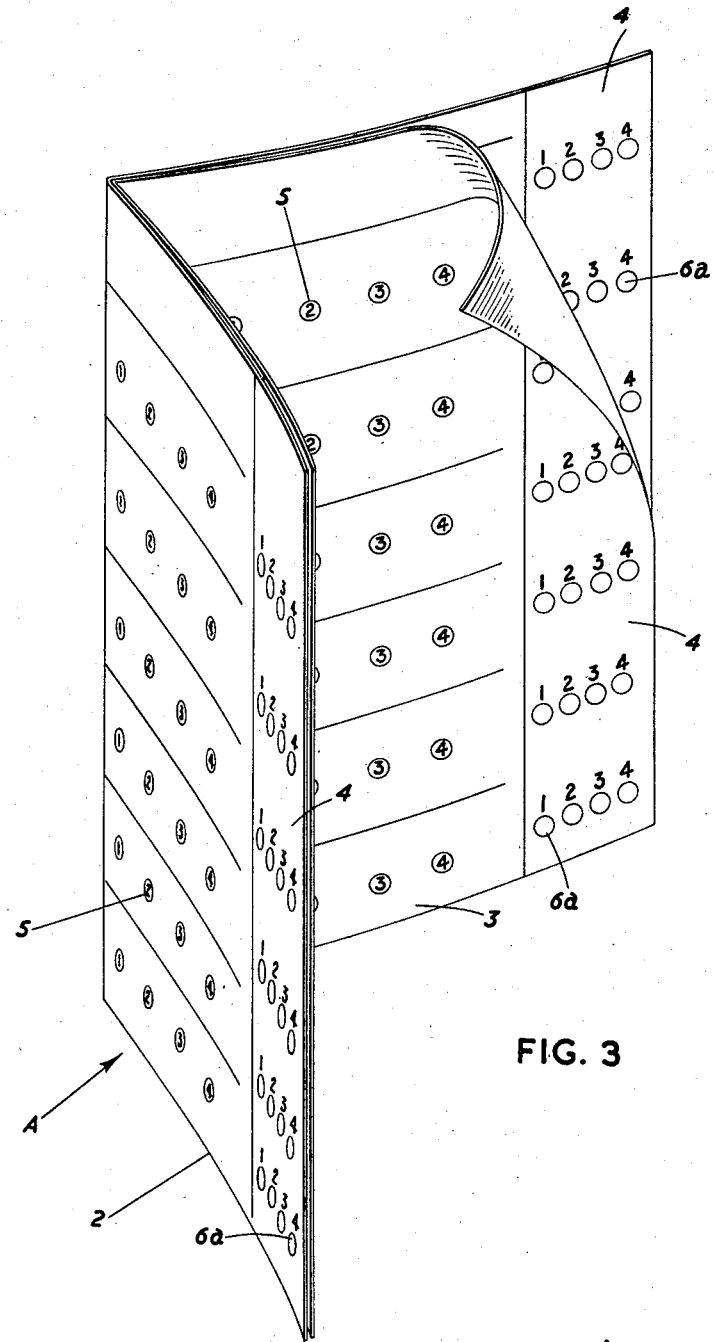
Fig. 3 is a schematic perspective view of an examination booklet according to the present invention.

In Fig. 3, a booklet is shown wherein the answers are located in the common answer area 4 on each sheet so that an examination paper comprised of a plurality of sheets with answers on surfaces thereof may be examined in a similar manner. In other words, the answer spaces 6a are offset on each surface with respect to those on other surfaces and since the answer areas register with one another, it will be clear that when light is caused to pass through the plurality of sheets, the answers from all sheets may be examined from the uppermost sheet in one simple checking operation.

As an aid to making answer spaces clearly discernible through from the back of a single sheet or through a plurality of sheets, when light rays are passed therethrough, the answer area of the sheet or sheets may be rendered reasonably transparent by applying thereto in known manner a suitable substance for the purpose, such as vegetable fatty acid (ricinoluc acid combined with a resin to produce a printing consistency when reduced with a thin mineral oil). Thus the sheet may otherwise be of average character yet the answer area of all surfaces will be easily checked with the aid of an underlying light source.

Figure 5:
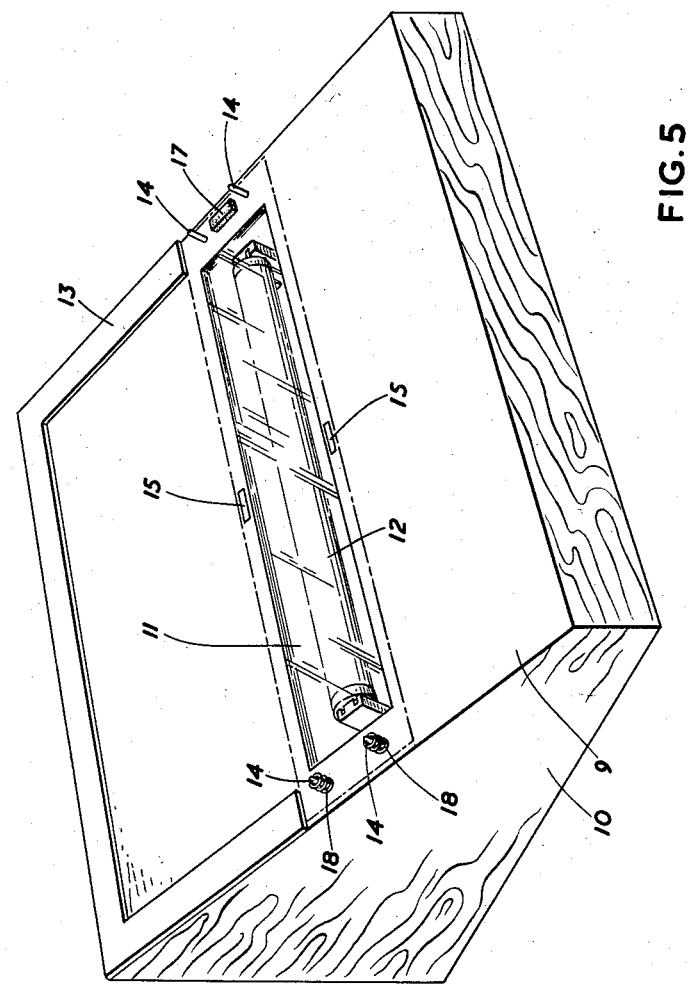
Fig. 5 is a perspective view of a type of an inwardly illuminated table stand upon which an examination paper may be placed so that the light therein projects upwardly therethrough.
Figure 4:
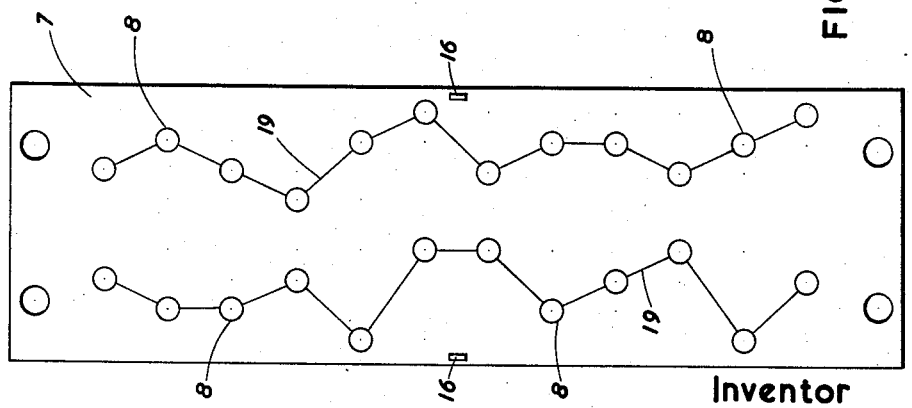
Fig. 4 is a plan view of the examination paper correcting stencil.

Fig. 4 illustrates a type of stencil 7 as used for simultaneous correction of the answer marks appearing on the various surfaces of the sheet material. As shown this comprises a stencil body substantially corresponding to the size of a double answer area as shown in Figs. 1 and 2 or the size of a single answer area, if such were employed, such as in Fig. 3 although it should be understood that the double answer areas may be employed in respect of a booklet, such as shown in Fig. 3, by following a similar form to that shown in Figs. 1 and 2. The stencil, as shown, is provided with windows 8 arranged to register with the correct answer spaces 6 on each surface of the sheet material when the stencil is correctly positioned in relation thereto, i. e. overlying it in the normal course or underlying it if desired. Thus, the examiner is able to check the answer marked on all surfaces of the sheet in one checking operation and the correct answer is readily determined in known way since the window in the stencil coincides with the correct answer. Where the stencil is opaque, apart from the windows, it is normally necessary for the examiner to scan the answers to determine that only one answer has been marked for each question. However, it is preferable to employ a stencil made of transparent material with a means of indicating the position where the correct answer shows in order that the examiner may see all answer spaces to ascertain that only one answer space has been marked. Thus, the stencil shown may be of transparent material, the body of which may have a colour and the windows 11 uncoloured, thus to indicate the correct answer while permitting the examiner to see that no markings occur in the other spaces. Moreover, any suitable means of indicating on the stencil the correct answer space may be employed. The examination paper is preferably combined with an illuminating device for facilitating the marking thereof. In Fig. 5, I have shown a suitable arrangement which includes an inclined support 9 mounted on side members 10 and contains a clear window 11 of substantially the same size as the answer space area of the examination paper to be placed thereon for correction. It will, of course, be appreciated in the alternative that the support might be transparent in itself.

An electric light bulb 12 is positioned to shine upwardly through the transparent element 11 and through the answer area of an examination paper placed thereover. To correctly position an examination paper laid upon the top 9, any suitable locating means is provided. For example, as shown in Fig. 5, the examination paper is laid upon the support 9 which has a U-shaped frame 13 arranged to border the rearward end and the adjacent portions of the side edges and is proportioned snugly to receive an examination paper positioned therein upon the support 9, the arrangement being such that the answer area of the paper overlies the transparent element 11 or light projecting area.

The stencil 7 formed from any suitable material as previously referred to may be conveniently and accurately placed in position by suitable guiding means such as pairs of guide pins 14 positioned on the support 9 at the ends of the light projecting area thereof and which are designed to pass through pairs of orifices at the end of the stencil when it is placed in position. Thus, when the stencil is pressed down into intimate engagement with an underlying examination paper or when an examination paper is pressed down over an underlying stencil, if the reverse course is chosen, it will be evident that the correct answers from all surfaces of the examination paper unit may be quickly noted.

As a means of causing the stencil firmly to engage an underlying examination paper, the support 9 may carry the small magnets 15 designed to register with the small metal elements 16 disposed on each side of the stencil adjacent its mid point which will be attracted by the magnets to hold the stencil firmly against the paper. Moreover, as a means of automatically lifting the stencil following the examining of the paper, suitable resilient means may be employed such as a small sponge rubber pad 17 (Fig. 5) located between pairs of pins 14 or, in the alternative, small coil springs 18 disposed on the pin. Thus, when a paper is pulled from under the stencil, the stencil is released from the pull of the magnets and this resilient means will automatically lift the stencil to prevent the insertion of another examination paper. It will be appreciated, of course, that any suitable means of temporarily securing the stencil and/or raising it is within the scope of the invention.

To facilitate rapid and accurate counting of correct answer marks showing through the stencil, the top face of the stencil may carry lines 19 extending from each correct answer location to another to form counting eye paths for the examiner. In addition, in cases where the questions are arranged in several group types and it is desired to score each group, the line 19 extending between grouped answer locations may be of a colour different from that of the lines extending between other grouped answer locations whereby the answer groups are readily identifiable.

In the above manner, it will be clearly appreciated that the examination papers having multiple surfaces may be examined in one efficient examining step wherein the answers on all surfaces are checked without the necessity of checking each surface separately. Furthermore, it will be understood that while a particular embodiment of the invention has been shown and described, the examination paper correction stencil and the light source unit are susceptible to other arrangements without departing from the spirit of the invention as set forth in the appended claims.

I claim:

1. Examination material for use with a stencil designed to indicate the location of correct answers comprising, sheet material of paper stock having a plurality of surfaces, each surface bearing questions to be answered and having a plurality of correct and incorrect answer spaces choosable at the election of the examinee, said answer spaces being located in an answer area, the answer area on one surface being located to correspond with the answer area of another surface, one underlying the other, the answer spaces on one surface being offset from those of another surface the answer areas of said surfaces being rendered translucent whereby all answer spaces and answers are discernible simultaneously from the uppermost surface, the correctness of the answers on said surfaces being simultaneously determined through said stencil, when light is projected through from the lowermost of said surfaces.

2. Examination material incorporating answer entering material of paper stock having a plurality of surfaces for manually written answer marks visible from the top surface of the sheet by the aid of light passing through said surfaces, said material having on a plurality of the surfaces, an answer area, bearing a plurality of correct and incorrect answer spaces choosable at the election of the examinee for the insertion of answer marks, the answer area of one surface being substantially in register with the answer area of another surface the answer areas of said surfaces being rendered translucent, and an examiner's correction stencil designed to be positioned in correlation to the answer area on the uppermost surface of the material and having areas of light transmitting character registering with the correct answer spaces on each plurality of surfaces of the sheet whereby the correctness of the answers on all surfaces of the material is quickly determined in one examining operation.

3. Examination material incorporating answer entering material of paper stock having a plurality of surfaces for manually written answer marks visible from the top surface of the sheet by the aid of light passing through said surfaces, said material having on a plurality of the surfaces an answer area, bearing a plurality of correct and incorrect answer spaces choosable at the election of the examinee for the insertion of answer marks, the answer area on one surface being substantially in register with the answer area of another surface thereof the answer spaces on one surface being offset from those of another surface, the answer areas of said surfaces being rendered translucent whereby manually written answer marks on said surfaces are caused to be visible through the uppermost surface of said material when light is projected therethrough from an underlying surface, and an examiner's correction stencil designed to be positioned in correlation to the answer area on the uppermost surface of the material and having areas of light transmitting character registering with the correct answer spaces on each plurality of surfaces of the sheet whereby the correctness of the answers on all surfaces of the material is quickly determined in one examining operation.

References Cited in the file of this patent

UNITED STATES PATENTS 2,157,036   Torkelson _____ May 2, 1939